May 3, 1932.  G. SEABERG  1,856,788
REPAIR CLAMP FOR BELL AND SPIGOT PIPE JOINTS
Filed July 31, 1930   2 Sheets-Sheet 1
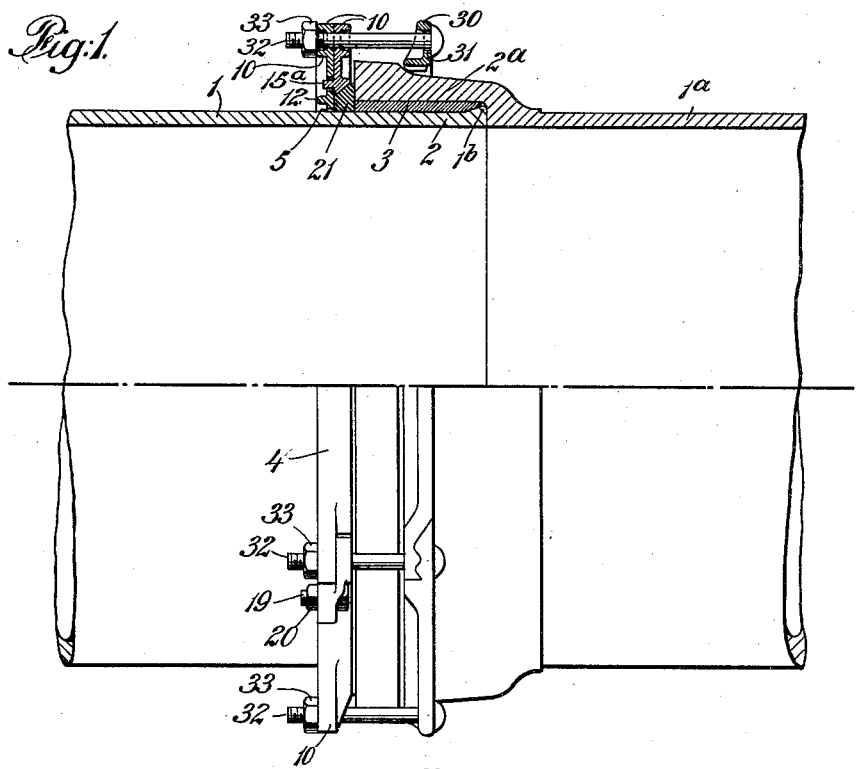
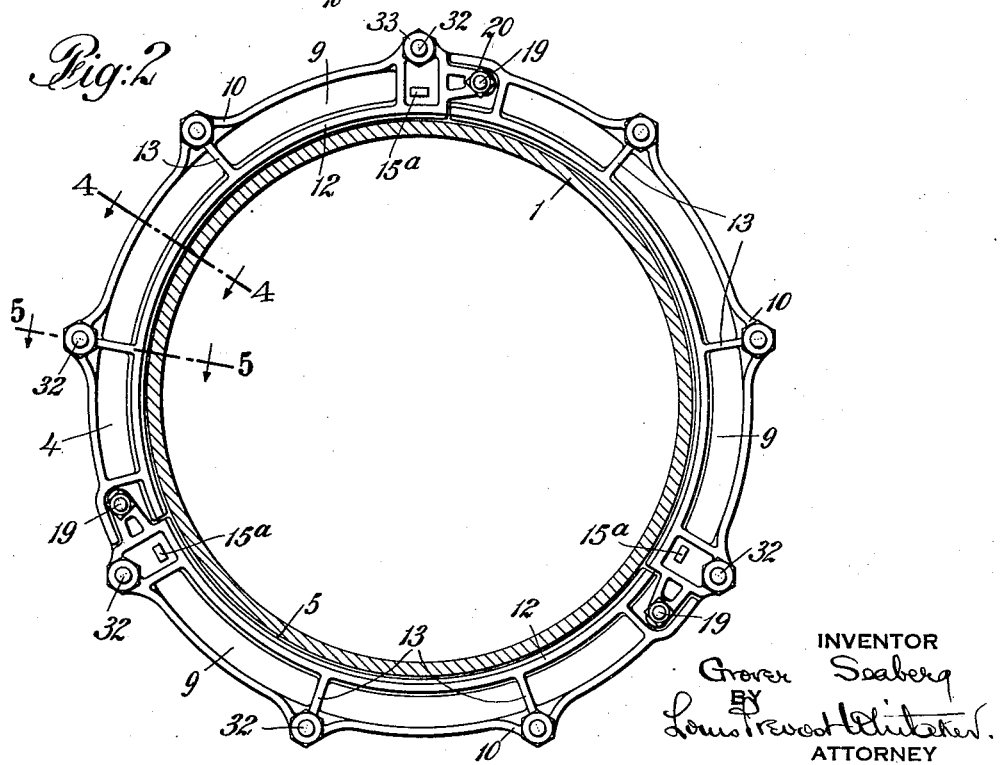
INVENTOR
Grover Seaberg
BY
Louis Prevost Whitaker
ATTORNEY

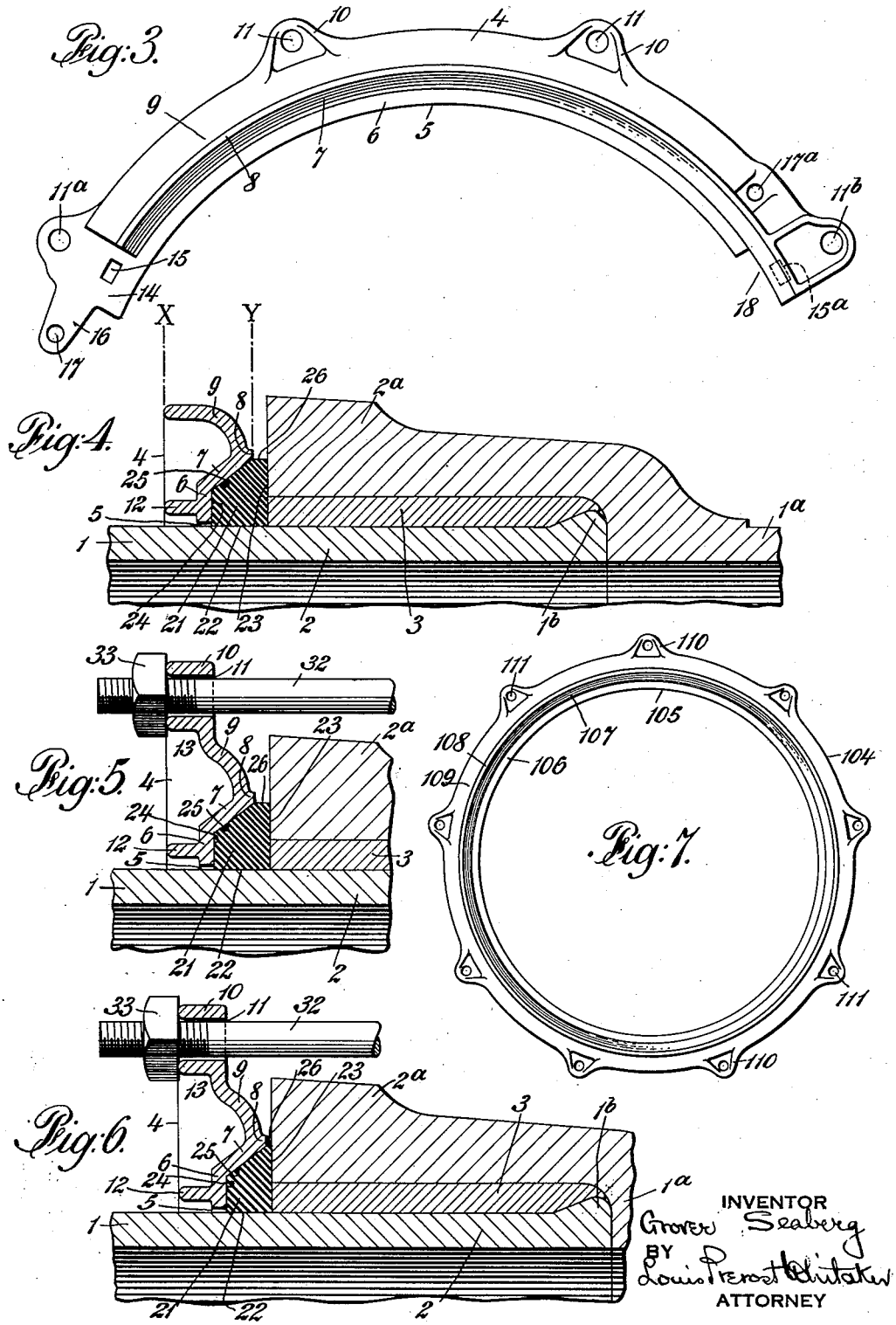

Patented May 3, 1932

1,856,788

UNITED STATES PATENT OFFICE

GROVER SEABERG, OF BRADFORD, PENNSYLVANIA, ASSIGNOR TO S. R. DRESSER MANUFACTURING COMPANY, OF BRADFORD, PENNSYLVANIA, A CORPORATION OF PENNSYLVANIA

REPAIR CLAMP FOR BELL AND SPIGOT PIPE JOINTS

Application filed July 31, 1930. Serial No. 472,011.

My invention consists in the novel features hereinafter described, reference being had to the accompanying drawings, in which I have shown two embodiments of the invention, selected by me for purposes of illustration, and the said invention is fully disclosed in the following description and claims.

In connection with bell and spigot pipe joints, it is frequently necessary to repair the same on account of the fact that the solid packing, as lead cement or other material which is inserted between the spigot end of one pipe section and the bell of the adjacent pipe section becomes loosened under changes of temperature, as by frost and other conditions, so as to bring about a leak. For this purpose it is customary to employ a clamp comprising essentially four elements, to wit, a packing ring for engaging the outer face of the spigot and the adjacent face of the bell and solid packing, a clamping ring for engaging the packing, a bull ring of larger diameter, internally, than the packing ring for engaging the projecting portion adjacent to the mouth of the bell, to form an anchorage for the clamp, and clamping bolts and nuts, the bolts passing through registering apertures in the bull ring and clamping ring. When the device is intended as a repair device for joints already made in a line, it is customary to make the clamping ring and bull ring in sections, suitably united so that they can be placed around the pipe line without disturbing it, and to form the packing with a diagonal cut so that it can be placed around the joint. In many instances, however, it has been found desirable to apply these clamps to certain or all the joints of a pipe line formed of bell and spigot pipe sections at the time the line is laid, and in such case the bull ring, clamping ring and packing ring may be made as integral rings, if desired, as they can be placed in position when the joints are made.

The tendency in the operation of pipe lines conveying gas and other fluids across considerable stretches of country, is to employ increasingly high pressures in pumping the fluid through the line, and naturally the higher the pressures, the more danger of leakage around the solid packings of bell and spigot joints, and the greater the amount of waste due to such leakage. In the manufacture of clamps of this type, it has been customary to provide the clamping rings with a comparatively shallow packing recess, and to employ a rubber packing ring of approximately rectangular cross section, so that when the packing ring was compressed, a very considerable space was left between the inner face of the clamping ring and the face of the bell. While these rings have proven to be entirely satisfactory for moderate pressures, they have not been found satisfactory for the higher pressure lines. The use of high pressures obviously necessitates greater bolt strain and greater compression of the packing rings, and it has been found in practice that there is a tendency for rubber packing rings under sufficient compression to "cold flow", or in other words, ooze through adjacent crevices, if of sufficient width. This "cold flowing" of the rubber effects a displacement of a certain quantity of rubber itself, but what is far more important, it tends to gradually reduce the compression of the entire body of rubber within the packing recess of the clamp so that it frequently happens that where a clamp is perfectly tight when applied, it will be found shortly afterwards, where the rubber has "cold flowed," to have effectively lost compression in the packing ring, so that a leak has resulted. This is particularly true with gas lines operating under the higher pressures.

The object of my present invention is to construct a clamp which will correct this defect and enable me to secure a sufficiently high compression of the rubber packing ring to resist leakage even under the highest compression, practically usable while at the same time preventing the possibility of "cold flow" on the part of the rubber packing ring, and without danger of distorting or breaking the clamping ring when exposed to the necessary bolt strain.

In carrying my invention into effect, I provide the clamping ring with a pipe orifice which is located between the planes of the inner and outer faces of the ring and is surrounded by an annular packing engaging wall perpendicular to the axis of the ring, from the outer edge of which there extends an inclined packing engaging annular wall disposed at an angle of approximately forty five degrees to the axis of the ring, and terminating at the inner face of the ring in a retaining shoulder, which is adapted to be brought into close relation to the face of the bell but without actual contact therewith when he clamp is in tightened position thus practically enclosing the packing ring, the clamping ring having an annular brace wall extending from said shoulder and away from the plane of the inner face of the ring and the adjacent face of the bell and increasing in diameter therefrom, and terminating substantially at the plane of the outer face of the ring, and being provided at its outer edge with projecting portions having bolt apertures therein. The ring is also preferably provided with an annular reinforcing flange extending from the perpendicular packing engaging face above mentioned in a direction parallel to the axis of the ring and terminating in the plane of the outer face of the ring, and radial webs are preferably provided between this reinforcing flange and the outer edge of the brace wall which are integrally connected therewith and with the inclined packing engaging wall. The packing recess is formed by the packing engaging walls above referred to, to receive a similarly shaped packing ring surrounding the spigot member of the joint, and having an inner cylindrical face for engaging the spigot member, an outer inclined annular, or conical face, a perpendicular annular face to engage the face of the bell, and the solid packing therein, and a short cylindrical outer face of greater length than the distance between the annular retaining shoulder of the ring and the face of the bell when the ring is in its tightened position. The packing ring projects beyond the outer edge of the inclined annular packing engaging flange of the clamping ring far enough to prevent the latter from coming into contact with the face of the bell when the packing is under the greatest pressure to which it can be subjected by the bolts. This clamping ring may be formed of sections or integral, as preferred, and employed in connection with a bull ring which likewise may be formed in sections, or integral, as preferred, suitable clamping bolts and nuts connecting the bull ring and clamping ring, in the usual manner. The construction of the clamping ring and packing is such that the packing ring will be compressed toward the face of the bell and toward the exterior surface of the spigot member, and when in fully compressed condition, only a very minute aperture will exist between the retaining shoulder of the clamping ring and the face of the bell member, of approximately the same width as the space between the pipe opening in the ring and the spigot member of the ring, both of which are made as close as possible. This construction prevents the "cold flowing" of the rubber packing ring and maintains the compression of the rubber at all times substantially constant.

Referring to the accompanying drawings, which illustrate two embodiments of my invention, selected by me for purposes of illustration, Fig. 1 is a side elevation, partly in section, of a bell and spigot joint provided with a clamp, embodying my invention, the clamping ring and bull ring being formed in segments.

Fig. 2 is an elevation of the clamping ring shown in Fig. 1, with the spigot member of the joint shown in section.

Fig. 3 is an enlarged elevation of one of the segments of the clamping ring shown in Figs. 1 and 2.

Fig. 4 represents an enlarged partial section on the line 4—4 of Fig. 2, before the clamping ring is fully tightened.

Fig. 5 is a similar view on the line 5—5 of Fig. 2, portions of the bell and spigot being further broken away, and the clamping ring being shown before it is fully tightened.

Fig. 6 is a view similar to Fig. 5, showing the position of the clamping ring when fully tightened.

Fig. 7 is a detail of a modified form of clamping ring which is formed in one piece.

In the drawings, 1 and 1ª, represent adjacent pipe sections, each of which is provided with a bell at one end and spigot member at the other. In Fig. 1, the pipe section, 1ª, is shown provided with the usual bell member, 2ª, to receive the adjacent spigot member, 2, of the pipe section, 1. 3 represents the usual solid or noncompressible packing, which may be of lead, cement, or other suitable material. 4 represents the clamping ring, which, as shown in Figs. 1 to 5 inclusive, is formed of a plurality of segments. It may be formed of two, three, four or more segments, as may be desired, and this is particularly convenient and advantageous where the clamp is applied to a joint in a line already laid. It is also desirable to make the ring of separable segments where the spigot member is provided with an enlargement, as indicated at 1ᵇ.

The ring, 4, is provided with a pipe aperture, indicated at 5, for closely surrounding the exterior surface of the spigot member, 2, this aperture being in a portion of the ring located between the planes of the inner and outer faces of the ring. For convenience of description, these planes are indicated in dotted lines in Fig. 4, in which X represents the plane of the outer face of the ring, and Y represents the plane of the inner face thereof. The ring is provided around the aperture, 5, with an annular packing engaging wall, 6, perpendicular to the axis of the ring, and from the outer edge of this wall, an annular inclined packing engaging and compressing wall, 7, extends to a point substantially in the plane, Y, of the inner face of the ring, where it terminates in an annular retaining shoulder indicated at 8. The wall, 7, is approximately at an angle of 45° to the axis of the ring, and to the planes of the inner and outer faces thereof. From the shoulder, 8, the ring is provided with a bracing wall, 9, curved in cross section, and extending from the retaining shoulder, 8, in a direction away from the plane of the inner face of the ring and the adjacent face of the bell and increasing in diameter therefrom, substantially to the plane of the outer face of the ring, although the outermost portion of this wall may be nearly or quite cylindrical, if desired. The brace wall, 9, is provided at suitable intervals with outwardly extending lugs, indicated at 10, and provided with bolt holes, 11, to receive the clamping bolts. The clamping ring is also provided with an annular reinforcing flange, indicated at 12 of greater diameter than the pipe aperture, projecting from the outer face of the perpendicular wall, 6, and extending substantially to the plane, X, of the outer face of the ring, and being substantially parallel to the axis of the ring. At suitable intervals, preferably in alignment with the axis of each of the bolt holes, for example, radial webs, 13, are provided, which unite the annular bracing flange, the perpendicular wall, 6, inclined wall, 7, and brace wall, 9, and having their outer edges substantially in alignment with the plane, X, of the outer face of the ring. Where the clamping ring is made in a series of segments, as shown in Figs. 1, 2 and 3, each segment is preferably formed in a manner indicated in the drawings, that is to say, cut away for half the thickness of the ring, the cut-away portion at one end of the segment being on the opposite face of the ring from the cut-away portion at the opposite end of the segment. Thus, as shown in Fig. 3, for example, which illustrates one of the three segments of the ring shown in Figs. 1 and 2, the segment is provided at one end with a cut-away portion, leaving a flat face, 14, provided with a locking aperture or recess, 15. For the purpose of securing the segments of the ring together in assembled relation for transportation and handling, and to hold them united when in use, it is found desirable to provide the cut-away portion, 14, with an extension, indicated at 16, provided adjacent to its outer end, with a bolt holt, 17. It is also convenient and desirable to make the line of separation between adjacent segments at one of the bolt holes for the clamping bolts, and so arrange the cut-away portions that the overlapping parts of adjacent segments will be provided with registering bolt hole portions, and the cut-away portion, 14, is shown with a bolt aperture, 11ª. At the other end of the segment, the opposite face of the ring is cut away, as indicated at 18, and provided with a bolt hole, 11ᵇ, to register with the bolt hole, 11ª, of the adjacent segment, and with a locking stud, 15ª, to engage and interlock with the locking recess, 15, of the adjacent segment. The segment is also provided adjacent to the cut-away portion, with a bolt hole, 17ª, adapted to register with the bolt hole, 17, in the projection, 16, of the adjacent segment. When two segments are interlocked, a short bolt, 19, is passed through the registering apertures, 17 and 17ª, after the parts are properly placed in position, and the interlocking projection and recess, 15ª, 15, are interengaged, and the bolt, 19, is provided with a nut, 20, which is screwed up to secure the segments in assembled relation, as clearly illustrated in Figs. 1 and 2.

The packing ring is indicated as a whole at 21, and is provided with a cylindrical inner face, 22, to engage the outer face of the spigot member, 2, a perpendicular annular face, 23, to engage the adjacent face of the bell member, 2ª, and packing, 3. The packing ring is also provided with an outer perpendicular face, 24, to engage the wall, 6, of the clamping ring, and with an inclined face, 25, to engage the inclined wall, 7, of the clamping ring. The packing ring is of greater width than the depth of the packing recess of the clamping ring, and is also provided with an exterior cylindrical face 26, which is of greater length than the distance between the shoulder, 8, of the clamping ring, and the face of the bell, 2ª, when the clamp is in tightened condition, as indicated in Figs. 1 and 6.

30 represents the bull ring, which may be of any desired type, and is provided with an interior aperture of such diameter that it will not slip over the enlarged portion of the bell. The bull ring is provided with a series of bolt apertures, one of which is indicated at 31 in Fig. 1, adapted to register with the bolt apertures in the clamping ring, and the bull ring may be made either integral or in segments, and if in segments, may be connected in any usual or desired manner, as the particular form or type of bull ring has no bearing on my present invention.

In assembling the parts of the clamp upon the coupling, the packing ring will be placed around the spigot member, in the position shown in the drawings. It is customary to form the packing ring as an integral ring of rubber or other suitable material, and to sever it diagonally at one point, for convenience in passing it around the spigot member, but obviously it can be made by severing the required length from stock, if preferred. The bull ring is applied to the bell and the clamping ring is applied to the spigot member, and moved toward the face of the bell, so as to substantially enclose the packing ring, 21, within the packing recess of the clamping ring, as shown, for example, in Figs. 4 and 5 a portion only of the packing ring projecting from the packing recess for a distance substantially equal to the width of the exterior cylinder face, 26. The usual clamping bolts, indicated at 32, are then passed through the registering bolt holes of the bull ring and clamping ring, and the nuts, 33, are applied thereto, and turned up. As the bolt therethrough increases, the clamping ring will be caused to move toward the face of the bell member. This produces a compression of the packing ring not only in the direction longitudinally of the joint, but also transversely thereof, and the packing is compressed between the perpendicular wall, 6, and inclined wall, 7, of the clamping ring, the face of the bell and solid packing, 3, and the outer surface of the spigot member. The bracing wall or flange, 9, transmits the bolt strain to the flanges, 6 and 7, but is at all times held out of any possible contact with the face of the bell. Where the bolt strain is applied at the outer edge of a ring of this character, there is a tendency for the outer marginal portions to spring or bend in a direction of the bolt strain, with respect to the inner portions of the ring, and in a repair clamp for a bell and spigot joint if the ring came into contact with the face of the bell, the strain of the bolts would be transmitted to the bell and the rubber would be thereafter relieved from further strain, so that it could not be compressed to the desired extent. In my construction this cannot occur, and any bending or flexing of the ring would merely have the effect of forcing the outermost portions of the packing compressing flange, 7, inwardly, in a direction toward the spigot, and would result in any case in transmitting the bolt strain to the packing ring in the desired direction, that is, toward the spigot and toward the face of the solid packing surrounding the same within the bell. When the packing is fully compressed, there will be very little space between the annular shoulder, 8, and the face of the bell, approximately about the same amount of space as there will be of necessity between the pipe aperture, 5, of the clamping ring, and the outer surface of the spigot member, and this amount of space in the latter place must be present to accommodate customary irregularities in the surface of the spigot member. The spaces between the shoulder, 8, and face of the bell, and between the pipe aperture and the spigot member, will, however, be so small, that no appreciable "cold flow" of the rubber thereinto can take place, so that the compression of the rubber packing is uniformly maintained, so long as the bolt pressure remains the same, and no relaxation of the compression of the rubber packing will be permitted.

In Fig. 7, in which the parts corresponding to those previously described are given the same reference numerals with the addition of 100, I have illustrated a clamping ring embodying my invention, which is formed in one piece, and I desire to have it understood that the ring may be so made where its use is practicable and desirable. In most cases, however, and particularly where the clamping ring is to be applied to an existing line, or used in connection with a spigot member having an annular projecting portion on its end of greater diameter than the pipe aperture of the clamping ring, it will be necessary to form the ring in segments, substantially as hereinbefore described. These segments may, however, be connected in any usual or desired manner, and the particular means for connecting them forms no part of my present invention.

The clamping ring may be made of any desired material, but it will be usually found more convenient to make it of malleable cast iron.

While the herein described clamping ring is particularly applicable for use in connection with bell and spigot joints I wish it to be understood that it may be used in any other form of repair clamp or pipe coupling in connection with which its use may be found desirable or advantageous.

What I claim and desire to secure by Letters Patent is:—

1. In a repair clamp for bell and spigot pipe joints, a clamping ring provided with an annular packing engaging flange, disposed substantially perpendicularly to the axis of the ring and located at a considerable distance from the inner face of the ring, the inner edge of said flange forming the pipe aperture of the ring, a substantially conical packing engaging flange integral with the outer edge of said perpendicular flange and extending therefrom substantially to the plane of the inner face of the ring, and an annular bracing flange integral with the outer edge of said substantially conical flange and extending outwardly therefrom, and in a direction away from the plane of the inner face of said ring, and provided at its outer edge with bolt engaging portions, said bracing flange being held at all times out of contact with the face of the bell.

2. In a repair clamp for bell and spigot pipe joints, a clamping ring provided with an annular packing engaging flange, disposed substantially perpendicularly to the axis of the ring and located at a considerable distance from the inner face of the ring, the inner edge of said flange forming the pipe aperture of the ring, a substantially conical packing engaging flange integral with the outer edge of said perpendicular flange and extending therefrom substantially to the plane of the inner face of the ring, and an annular bracing flange integral with the outer edge of said substantially conical flange and extending outwardy therefrom, and in a direction away from the plane of the inner face of said ring, and provided at its outer edge with bolt engaging portions, said bracing flange being held at all times out of contact with the face of the bell, a cylindrical reinforcing flange substantially parallel with the axis of the ring and of greater internal diameter than said pipe aperture integral with said perpendicular flange, and extending therefrom in a direction toward the plane of the outer face of said ring, and radial webs connecting said reinforcing flange, said packing engaging flanges, and said bracing flange.

3. In a repair clamp for bell and spigot pipe joints, a clamping ring provided with an annular packing engaging flange, disposed substantially perpendicularly to the axis of the ring and located at a considerable distance from the inner face of the ring, the inner edge of said flange forming the pipe aperture of the ring, a substantially conical packing engaging flange integral with the outer edge of said perpendicular flange and extending therefrom substantially to the plane of the inner face of the ring, and an annular bracing flange integral with the outer edge of said substantially conical inclined flange and extending outwardly therefrom, and in a direction away from the plane of the inner face of said ring, and provided at its outer edge with bolt engaging portions, said bracing flange being held at all times out of contact with the face of the bell, and a packing ring provided with an annular cylindrical face for engaging the spigot, a broad annular face substantially perpendicular to its axis for engaging the face of the bell and the solid packing therein, an oppositely disposed perpendicular annular face of less width to engage the perpendicular flange of said clamping ring, and a substantially conical exterior face for engaging the substantially conical flange of said clamping ring, said packing ring being of greater depth than the packing recess of the clamping ring, and the projecting portions of the packing ring being provided with an exterior cylindrical face at the outer end of the substantially conical face thereof.

In testimony whereof I affix my signature.
GROVER SEABERG.